US007167781B2

(12) United States Patent  
Lee

(10) Patent No.: US 7,167,781 B2  
(45) Date of Patent: Jan. 23, 2007

(54) TACTILE DEVICE AND METHOD FOR PROVIDING INFORMATION TO AN AIRCRAFT OR MOTOR VEHICLE OR EQUIPMENT OPERATOR

(76) Inventor: Hugh T. Lee, 22 Featherbed La., Derry, NH (US) 03038

( * ) Notice: Subject to any disclaimer, the term of this patent is extended or adjusted under 35 U.S.C. 154(b) by 312 days.

(21) Appl. No.: 10/844,726

(22) Filed: May 13, 2004

(65) Prior Publication Data

US 2005/0267649 A1    Dec. 1, 2005

(51) Int. Cl.
  *A61N 1/08* (2006.01)
  *H04B 3/36* (2006.01)
(52) U.S. Cl. ............................. 701/3; 701/1; 340/407.1; 607/152
(58) Field of Classification Search .................... 701/3, 701/1; 340/407.1, 7.6, 959; 434/113, 114; 601/78; 244/1, 77; 607/152
See application file for complete search history.

(56) References Cited

U.S. PATENT DOCUMENTS

| 2,078,982 | A | | 5/1937 | Stark | 244/1 |
| 3,902,687 | A | | 9/1975 | Hightower | 244/77 |
| 4,926,879 | A | * | 5/1990 | Sevrain et al. | 607/152 |
| 5,594,415 | A | * | 1/1997 | Ishikawa et al. | 340/467 |
| 5,719,561 | A | * | 2/1998 | Gonzales | 340/7.51 |
| 6,175,315 | B1 | * | 1/2001 | Millard et al. | 340/959 |
| 6,757,916 | B1 | * | 7/2004 | Mah et al. | 2/456 |
| 6,809,462 | B1 | * | 10/2004 | Pelrine et al. | 310/319 |
| 6,930,590 | B1 | * | 8/2005 | Ling et al. | 340/407.1 |

* cited by examiner

*Primary Examiner*—Tan Q. Nguyen  
(74) *Attorney, Agent, or Firm*—Davidson, Davidson & Kappel, LLC

(57) ABSTRACT

A tactile device for an aircraft operator has a plurality of tactors for being passively attached to an aircraft operator, the plurality of tactors including a first tactor and a second tactor neighboring the first tactor. A control system controls actuation of the tactors as a function of a variable representing a characteristic of the operation of the aircraft, the control system actuating the first tactor when the variable reaches a first predetermined value, and actuating both the first and second tactor when the variable reaches a second predetermined value different from the first predetermined value. Other tactile devices and methods for actuating tactile devices are also provided.

26 Claims, 4 Drawing Sheets

TACTILE DEVICE AND METHOD FOR PROVIDING INFORMATION TO AN AIRCRAFT OR MOTOR VEHICLE OR EQUIPMENT OPERATOR

BACKGROUND

The present invention relates to a tactile device and method for providing information to an aircraft, motor vehicle or equipment operator.

Devices and methods for providing information tactually to aircraft operators are known.

U.S. Pat. No. 2,078,982, hereby incorporated by reference herein, for example, describes a tactile device for registering airspeed, altitude or a turn indicator. The information is provided tactually via the operator grasping the tactile device, and is not provided passively.

U.S. Pat. No. 3,902,687, also hereby incorporated by reference herein, describes an aircraft indicator system having a seat cushion and a leg clamp with left and right vibrators which indicate to the aircraft operator a deviation from a course selected via a radio navigational aid receiver. A frequency of vibration is indicative of the magnitude of the deviation.

The United States Navy at http://www.namrl.navy.mil/TSAS/, the entire description of which is also hereby incorporated by reference herein, describes a tactile situation awareness system (TSAS) which provides aircraft operators with a vest with tactors arranged in a grid fashion. The tactors provide pitch and roll information via absolute actuating of the tactors. In other words, to convey information regarding pitch, only one tactor at a time is actuated.

BRIEF SUMMARY OF THE INVENTION

An object of the present invention is to improve the ability to convey information tactually to aircraft operators. An alternate or additional object of the present invention is improve the ability to convey information tactually to motor vehicle or equipment operators.

The present invention provides a tactile device for an aircraft operator which has a plurality of tactors passively attached to an aircraft operator, the plurality of tactors including a first tactor and a second tactor neighboring the first tactor. A control system controls actuation of the tactors as a function of a variable representing a characteristic of the operation of the aircraft and actuates the first tactor when the variable reaches a first predetermined value. The control system then actuates both the first and second tactor when the variable reaches a second predetermined value different from the first predetermined value.

By providing for actuation of both the first and second tactors as the variable changes value, the operator obtains a relative sensation between the first tactor and the second tactor which improves the ability of the operator to detect the actuation of the second tactor. Advantageously, less powerful tactors or more closely spaced tactors may be provided to convey the information from the variable.

By having the tactors passively attached to the operator, as opposed to on a handle or at the seat where the position of the operator with regard to the tactors may change, the tactors also may convey information more effectively.

The tactile device may include a third tactor, the second tactor being located between the first and third tactors, the first, second and third tactors all being actuated when the variable reaches a third predetermined value, a difference between the first predetermined value and the third predetermined value being greater than a difference between the first predetermined value and the second predetermined value. In other words, the direction of actuation of the tactors and of the value of the variable are the same. Thus for example if the characteristic is altitude, as the altitude reaches a first level, the first tactor may be actuated, as it reaches a higher second level, the first and second tactors are actuated, and as it reaches yet a higher third level, the first, second and third tactors are actuated.

The first, second and third tactors may be arranged linearly, and may be spaced equidistantly, and the difference between the first predetermined value and the second predetermined value may be the same as the difference between the second predetermined value and the third predetermined value.

Preferably, the characteristic is one of altitude or airspeed. These characteristics are well suited to expression via a row of tactors. The characteristic also could be the proximity of the aircraft in relation to a threat, for example a surface-to-air missile or another nearby aircraft.

The tactors for example may be spaced within two centimeters of each other, or more preferably within one centimeter or less of another. Since a forearm, which is an advantageous location for the tactors of the present invention, typically provides about 20 centimeters of tactile space, up to twenty or more tactors may be able to be provided on the forearm. Each individual tactor may be 1.0 cm or less in length and width, and even less than 0.5 cm in length and width. Small piezoelectric tactors for example may advantageously be used with the present invention.

Preferably, the tactors are supported by a longitudinal strip of material, which may be fastened for example via perpendicular VELCRO or adhesive tape strips to the forearm. This permits easier attachment of a plurality of tactors. The tactors also may be fastened by a longitudinal strip of adhesive tape or by other means.

The present invention also provides a tactile device for an aircraft operator in which a plurality of tactors are passively attached to an aircraft operator, the plurality of tactors including a first tactor and a second tactor neighboring the first tactor. A control system controls actuation of the tactors as a function of a variable representing a characteristic of the operation of the aircraft, the control system actuating the first tactor as a marker, and actuating the first and second tactors when the variable reaches a first predetermined value.

The marker, which for example may be actuated when the device is first turned on or the aircraft started and always left on, advantageously also provides for relative sensation when the second tactor is actuated.

The present invention also provides a tactile device for an aircraft operator comprising a strip-shaped tactor passively attached to the aircraft operator over a longitudinal surface and infinitely variable in the longitudinal direction. A control system controls actuation of the strip-shaped tactor as a function of a variable representing a characteristic of the operation of the aircraft, the control system actuating the strip-shaped tactor longitudinally as a function of the variable.

The strip-shaped tactor functions similarly to the plurality of tactors but provides for infinitely variable sensation, for example via a spring-loaded inflatable device.

The control system may actuate the strip-shaped tactor longitudinally in a direct linear relation to a value of the variable, but may also proceed logarithmically or in other related fashion.

The present invention also provides a tactile device for an aircraft operator with a tactor passively attached to an aircraft operator, the tactor having a characteristic infinitely variable between two points. A control system controls the infinitely-variable characteristic of the tactor as a function of a variable representing a characteristic of the operation of the aircraft, the characteristic being independent of signals generated outside the aircraft. Thus altimeter and airspeed signals, generated onboard, may be provided via the infinitely-variable tactor characteristic.

The infinitely-variable characteristic may be for example a vibration of the tactor, a temperature of the tactor, an electric voltage of the tactor, or a pressure provided by the tactor to the operator.

The present invention also provides a method for actuating a plurality of tactors passively attached to an aircraft operator, the plurality of tactors including a first tactor and a second tactor neighboring the first tactor. The method includes actuating a first tactor when a variable reaches a first predetermined value or as a marker, the variable being a function of a variable representing a characteristic of the operation of the aircraft and actuating the second tactor when the variable reaches a second predetermined value.

The present invention also provides a method for actuating a strip-shaped tactor passively attached to an aircraft operator, the strip-shaped tactor being longitudinally actuable. The method includes actuating the strip-shaped tactor to provide a signal at a first tactile location when a variable reaches a first predetermined value or as a marker, the variable being a function of a variable representing a characteristic of the operation of the aircraft and actuating the strip-shaped tactor to provide further signals longitudinally downstream from the first tactile location as a value of the variable changes.

Any of the tactile devices according to the present invention above may also be provided for a motor vehicle or equipment operator to provide information regarding a motor vehicle or other equipment operating characteristic.

BRIEF DESCRIPTION OF THE DRAWINGS

Various embodiments of the present invention are described with respect to the figures in which.

DETAILED DESCRIPTION

Figure 1:
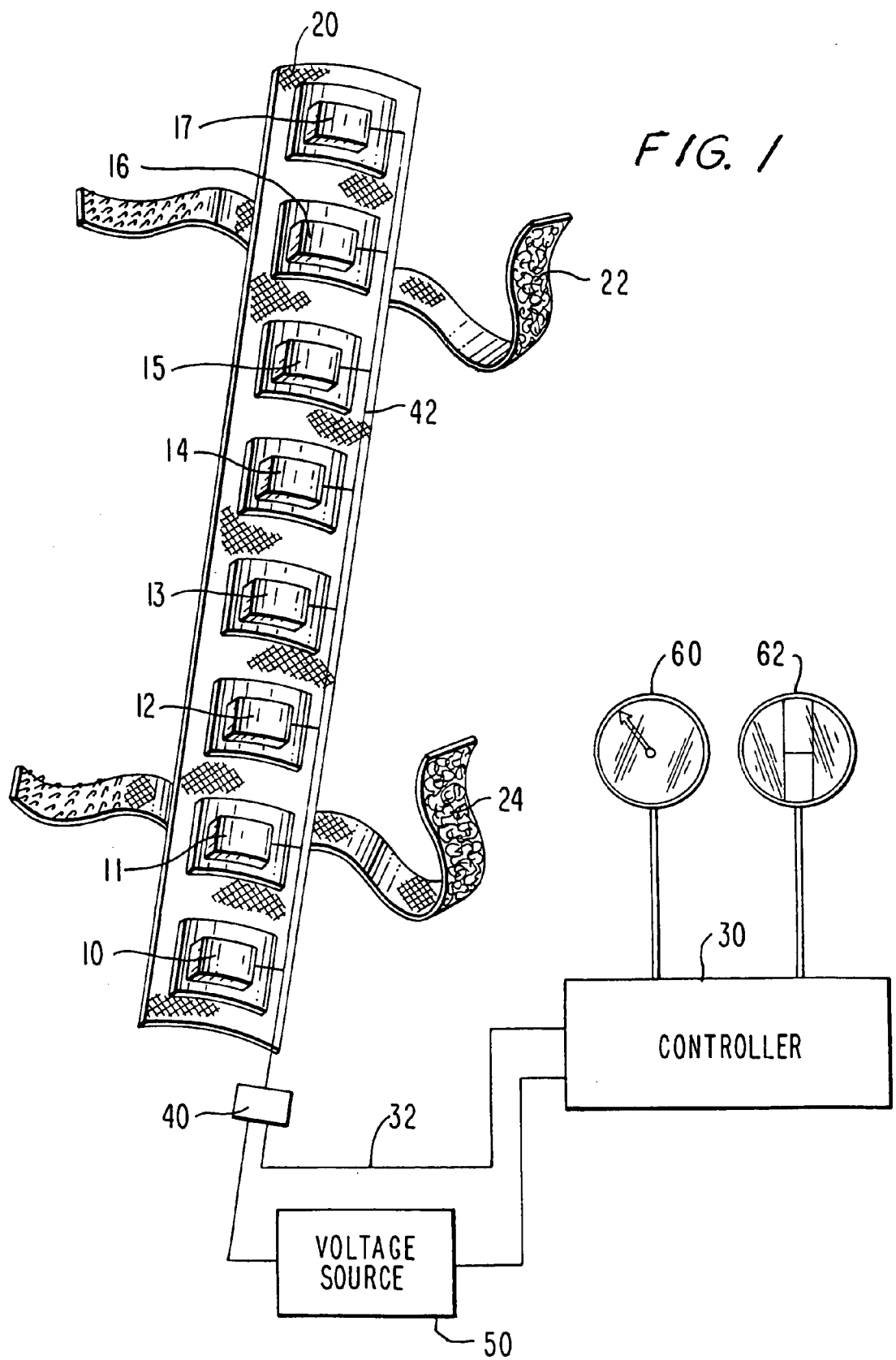
FIG. 1 shows a tactile device having a plurality of tactors for attachment to a forearm of an aircraft, motor vehicle or equipment operator.

FIG. 1 shows a tactile device having a plurality of tactors for attachment to a forearm of an aircraft, motor vehicle or equipment operator. A plurality of tactors 11, 12, 13, 14, 15, 16 and 17 are arranged linearly and spaced at equal distances on a longitudinal strip of material 20, which can be attached via VELCRO or adhesive tape strips 22, 24 for example to the forearm of an aircraft operator. Preferably, the tactors directly contact the skin of the operator. The strip of material 20 or tactors 11 may for example be about 0.25 inches wide. The strip of material preferably is made of cloth or other flexible natural or synthetic material.

The tactors may be piezoelectric or pneumatic tactors for example, or may be vibrating motors, for example those manufactured by ALCOM or JAMECO, or may be tactors which provide heat or a minor electric charge to the skin. The tactors may contact the skin directly through cutouts in the strip 20, or if appropriate through the strip 20. A lubricant or gel may be used to increase electric sensitivity to the charge.

A voltage source 50 may provide electricity to the tactors through a flexible connection 40. A battery source alternately could be located directly on the strip 20.

A controller 30 may receive inputs from an airspeed detector 60 and/or an altimeter 62, and/or other components of the aircraft or of a motor vehicle or other equipment.

As a function of theses inputs, controller 30 controls individual actuation of the tactors via connection 40 and a flexible control line 32. Each tactor may be connected to a bus 42 and has an individually addressable location for a header for control signals from the controller 30. For example, with eight tactor system shown, a three bit header can be used, as well as a single bit on/off control signal. The connections between the controller 30 and tactors and aircraft operating signal inputs may be wireless. Each tactor may also be connected via an individual wire or other connection to the controller 30, instead of through the bus 42.

As an example, tactor 10 may function as an initiation tactor, and is actuated for example when the operator inputs a control to the aircraft controller 30 indicating that the strip 20 is attached to the operator. As the aircraft increases in speed, for example to 100 miles per hour, tactor 11 is actuated. When the aircraft reaches 200 miles per hour, tactor 12 is actuated, and tactors 10 and 11 remain actuated. At 300 miles per hour, tactor 13 is actuated, and so on until at 700 miles per hour tactor 17, and thus all tactors 10 to 17 are actuated. As the aircraft slows the tactors are deactivated, starting with tactor 17.

The tactile device thus provides a sensitive tactile device for airspeed, which can aid in reducing or eliminating the need for the aircraft operator to view the airspeed indicator. The present invention has particular applicability to military aircraft where the pilots often face visual and aural information overload.

A second strip with tactors could be provided for the other arm for indicating altitude, and controlled by controller 30 in a similar manner as the altitude varies.

If the tactors operate via electronic signals to the skin surface of the aircraft operator, the present invention also provides that controller 30 can send a known electric charge to one of the tactors and measure the electric charge delivered via another, for example, neighboring, tactor so as to determine the skin resistance. Thus as the skin resistance of the aircraft operator varies, for example via perspiration, the electric charges delivered via the tactors can be varied. The operator also may control the electric charge strength, for example through input to controller 30.

Figure 2:
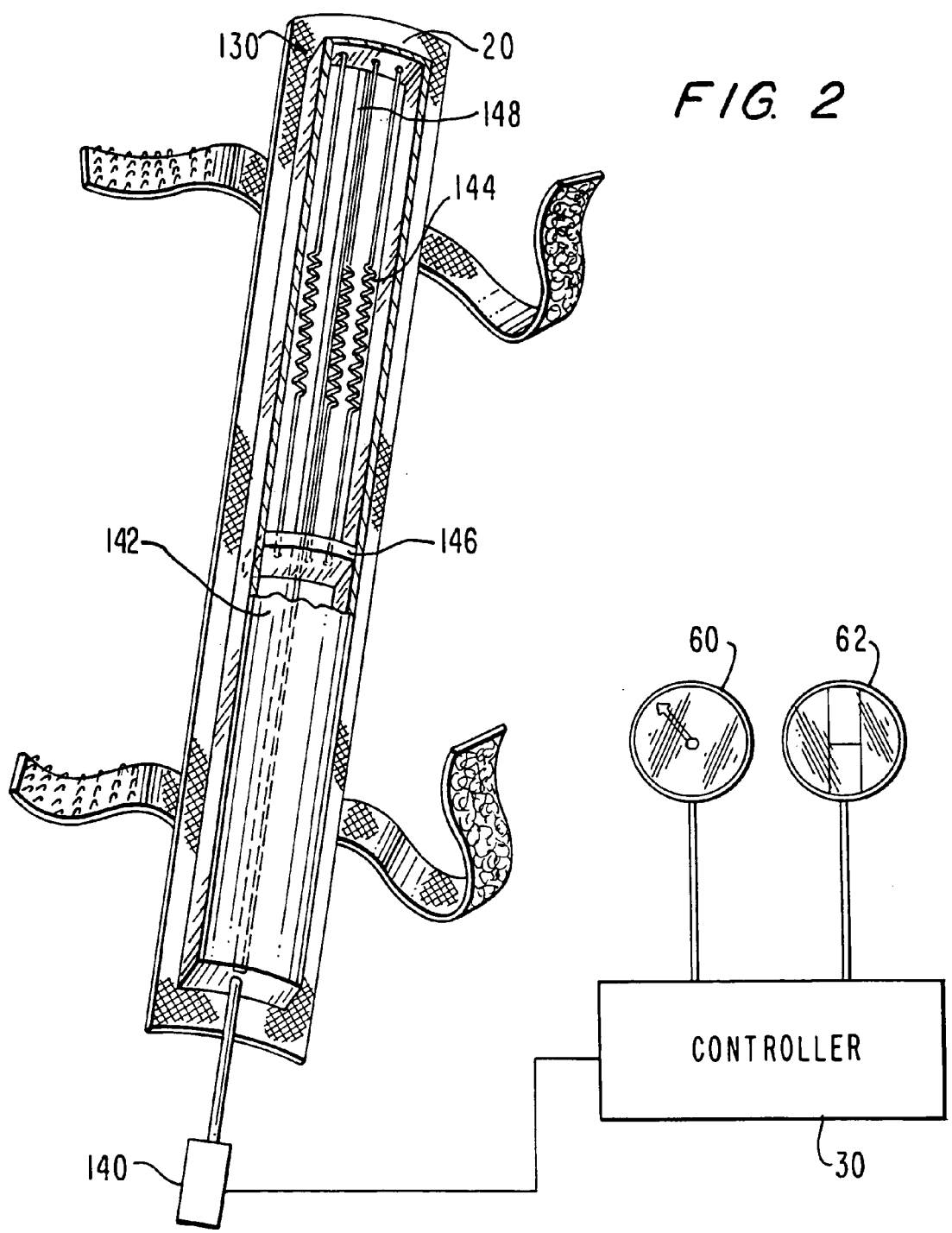
FIG. 2 shows a tactile device have a strip-shaped tactor.

FIG. 2 shows an alternate tactile device with an infinitely variable tactor, here made up of an inflatable device and a spring. A rectangular frame 130 with an open bottom may be attached to the strip 20, which may have a cutout 148. Frame 130 for example may be made of thin plexiglass. An inflatable bladder 142 may move a stopper 146 back and forth against springs 144, and may be inflated via a pneumatic pressure device 140, for example. The bladder 142 may be felt by the operator through its pressure through the strip 20, and if present, directly on the skin through cutout 148. The longitudinal extent of the bladder may increase or decrease as a function of the airspeed, so that for example the location of stopper 146 shown in FIG. 2 may indicate an airspeed of 455 miles per hour. The location of stopper 146 is infinitely variable within the frame 130. As airspeed decreases, pressure from pressure device 140 decreases and springs 144 force the stopper 146 and thus bladder 142 to move downwardly, as oriented in FIG. 2. The pneumatic connection between 140 and bladder 142 is flexible.

Figure 3:
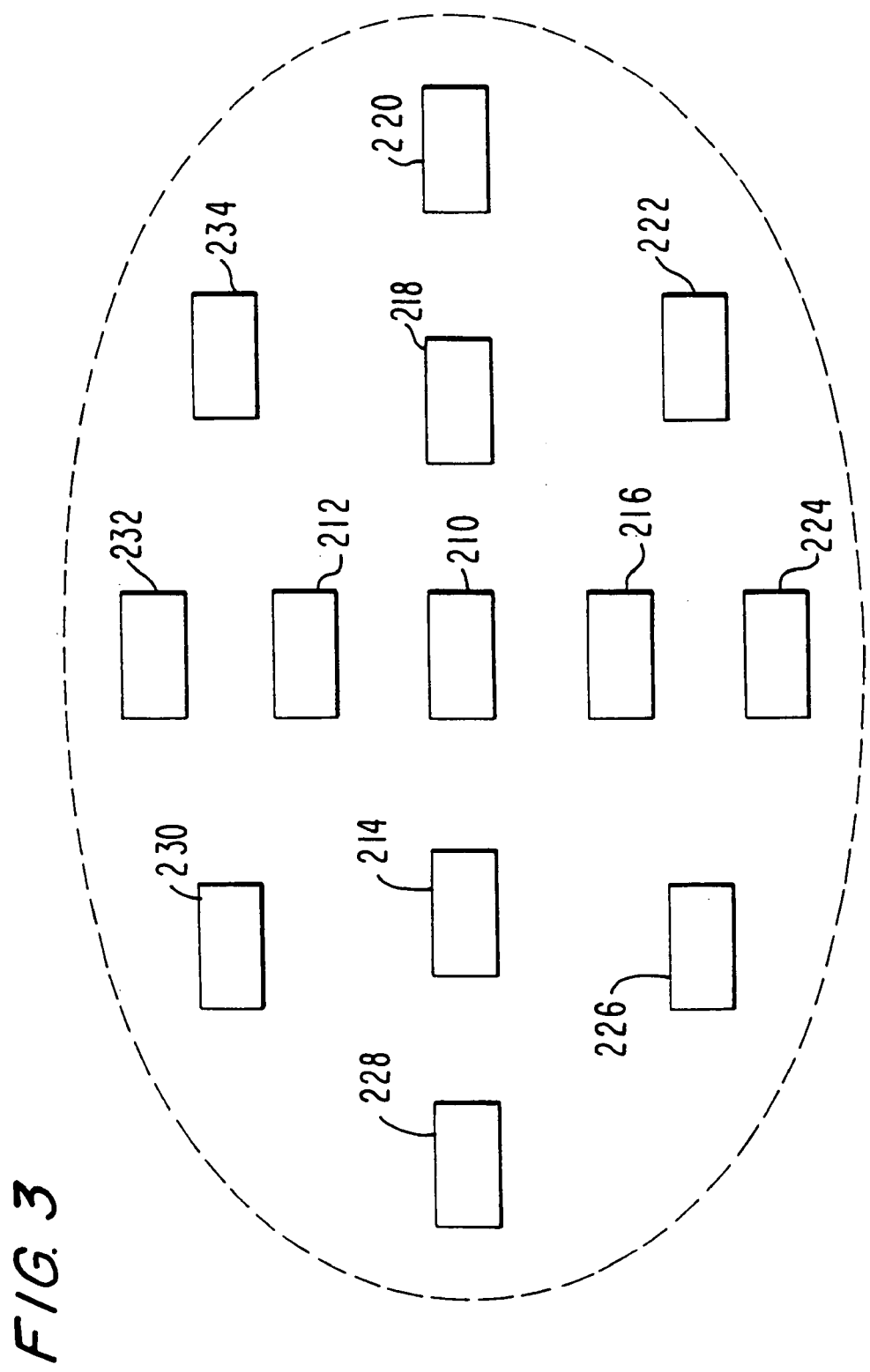
FIG. 3 shows an alternate tactile device in circular form.

FIG. 3 shows an alternate embodiment in which tactors 210, 212, 214, 216, 218, 220, 222, 222, 224, 226, 228, 230 and 232 are arranged in a circular or expanding pattern. Thus for example when the aircraft speed is 200 miles per hour, tactor 210 is actuated, at 300 miles per hour, tactors 210, 212, 214, 216 and 218 are actuated, and at 400 miles per hour, all tactors are actuated. More tactors outside the ring of tactors 220 to 234 maybe provided to provide even a larger expansion area. However other linearly-laterally expanding tactor patterns may be used, for example a V-shaped or inverted triangle pattern where the tip of the V represents a first speed or variable value, and the top of the V, which may be for example twelve or more tactors across a highest speed or variable value. A cross-shaped pattern is another example of a linearly-laterally expanding tactor pattern.

Figure 4:
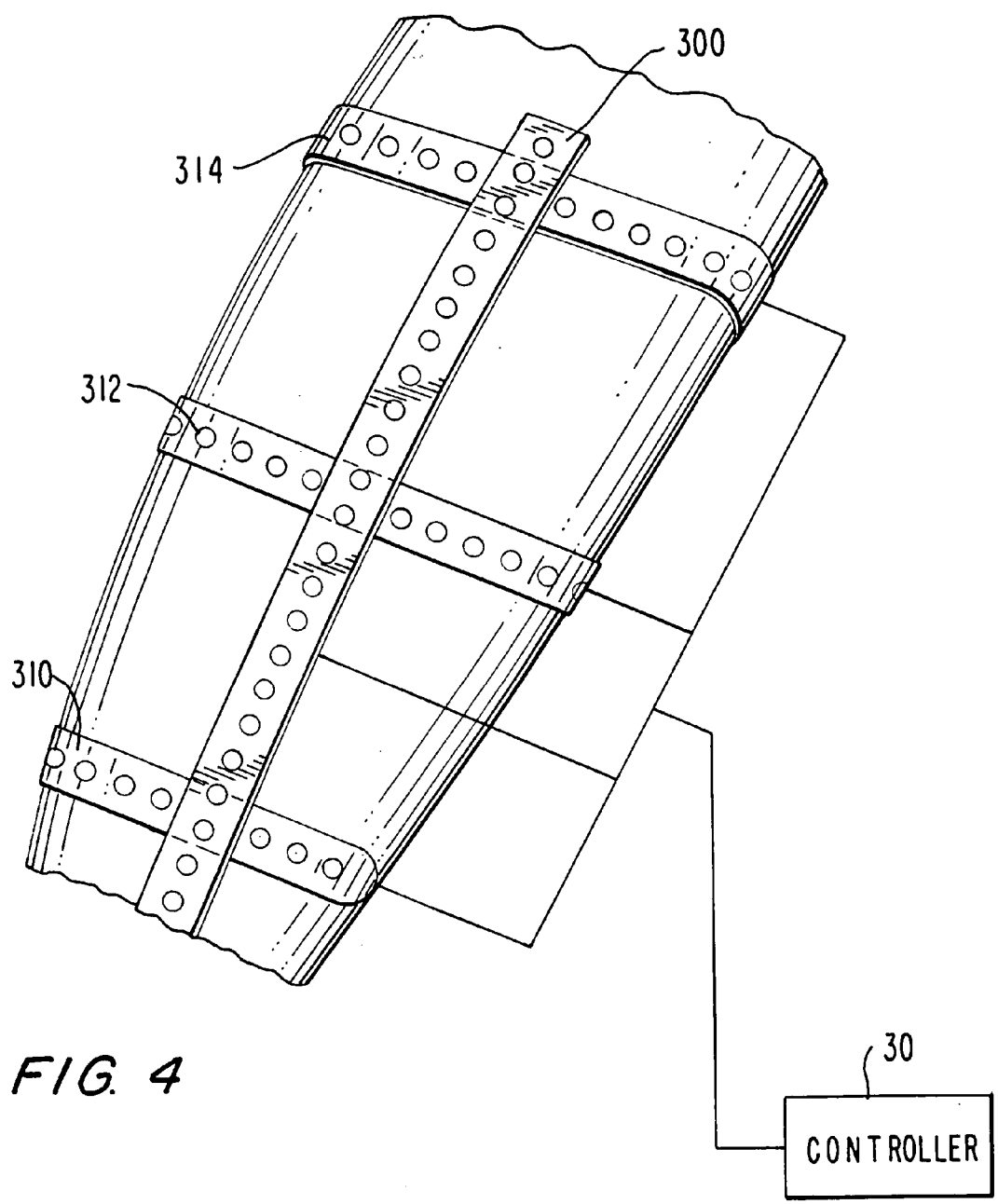
FIG. 4 shows an alternate tactile device similar to FIG. 1 with transverse marker strips.

FIG. 4 shows an alternate embodiment in which a main tactor strip 300 is supplemented with individual transverse marker tactor strips 310, 312, 314 spaced apart, for example on a forearm. The marker strips 310, 312, 314 may be spaced more then five centimeters apart. The marker strips 310, 312, 314 may be activated at all times or be triggered as the tactors on strip 300 are activated in linear fashion to reach the marker strip. Tactor marker strip 310 for example may indicate an aircraft speed of 200 miles per hour. Marker strip 312 may indicate 300 miles per hour. Marker strip 314 may indicate a speed of 400 miles per hour. The marker strip may have an actuating length of for example 1 to 1.5 inches in the transverse direction, and may be a single tactor or a plurality of tactors as described above. The individual tactors on strip 300 thus may be provide a finer feeling for the variable changes and operate similar to the FIG. 1 embodiment, while the marker strips 310, 312, 314 may aid the operator in determining the value of the variable.

It should also be noted that in an alternate embodiment of the present invention a single tactor could provide variable information in some cases. For example in the FIG. 1 embodiment, tactor 10 could vibrate at a frequency or amplitude indicative of airspeed 60, be heated or cooled to a temperature, or provide a pressure or an electric voltage indicative of airspeed 60.

The embodiments of FIGS. 1, 2, 3 and 4 could also be used for example to provide motor vehicle or equipment operating information, for example vehicle speed information or proximity information, for example the proximity of a crane to an object.

What is claimed is:

1. A tactile device for an aircraft operator comprising:
   a plurality of tactors for being passively attached to an aircraft operator, the plurality of tactors including a first tactor and a second tactor neighboring the first tactor; and
   a control system controlling actuation of the tactors as a function of a variable representing a characteristic of the operation of the aircraft, the control system actuating the first tactor when the variable reaches a first predetermined value, and actuating both the first and second tactor when the variable reaches a second predetermined value different from the first predetermined value.

2. The tactile device as recited in claim 1 wherein the plurality of tactors further includes a third tactor, the second tactor being located between the first and third tactors, the first, second and third tactors all being actuated when the variable reaches a third predetermined value, a difference between the first predetermined value and the third predetermined value being greater than a difference between the first predetermined value and the second predetermined value.

3. The tactile device as recited in claim 2 wherein the first, second and third tactors are arranged linearly.

4. The tactile device as recited in claim 2 wherein the first and second tactors and second and third tactors are spaced equidistantly.

5. The tactile device as recited in claim 4 wherein the difference between the first predetermined value and the second predetermined value is the same as the difference between the second predetermined value and the third predetermined value.

6. The tactile device as recited in claim 2 wherein the first and second tactors, and second and third tactors are spaced within two centimeters of each other.

7. The tactile device as recited in claim 1 wherein the characteristic is one of altitude or airspeed.

8. The tactile device as recited in claim 1 wherein the first and second tactors are spaced within two centimeters of each other.

9. The tactile device as recited in claim 1 further comprising a third tactor and a longitudinal strip of material, the first, second and third tactors being supported by the strip and being actuated in response to a variation of the variable.

10. The tactile device as recited in claim 9 further comprising a VELCRO attachment or adhesive tape to attach the longitudinal strip of material to the operator.

11. The tactile device as recited in claim 1 wherein the device attaches to a forearm.

12. The tactile device as recited in claim 1 wherein the plurality of tactors are arranged in a linearly-laterally expanding pattern.

13. The tactile device as recited in claim 1 wherein each of the plurality of tactors is a separate attachable strip.

14. The tactile device as recited in claim 1 further comprising lateral marker strips.

15. A tactile device for an aircraft operator comprising:
    a plurality of tactors for being passively attached to an aircraft operator, the plurality of tactors including a first tactor and a second tactor neighboring the first tactor; and
    a control system controlling actuation of the tactors as a function of a variable representing a characteristic of the operation of the aircraft, the control system actuating the first tactor as a marker, and actuating the first and second tactors when the variable reaches a first predetermined value.

16. A tactile device for an aircraft operator comprising:
    a strip-shaped tactor for being passively attached to the aircraft operator over a longitudinal surface and infinitely variable in the longitudinal direction; and
    a control system controlling actuation of the strip-shaped tactor as a function of a variable representing a characteristic of the operation of the aircraft, the control system actuating the strip-shaped tactor longitudinally as a function of the variable.

17. The tactile device as recited in claim 16 wherein the control system actuates the strip-shaped tactor longitudinally in direct relation to a value of the variable.

18. A tactile device for an aircraft operator comprising:

a tactor for being passively attached to an aircraft operator, the tactor having a characteristic infinitely variable between two points, and a control system controlling the infinitely-variable characteristic of the tactor as a function of a variable representing a characteristic of the operation of the aircraft, the characteristic being independent of signals generated outside the aircraft.

19. The tactile device as recited in claim 18 wherein the infinitely-variable characteristic is a frequency or amplitude of vibration of the tactor.

20. The tactile device as recited in claim 18 wherein the infinitely-variable characteristic is a temperature of the tactor.

21. The tactile device as recited in claim 18 wherein the infinitely-variable characteristic is an electric voltage or current of the tactor provided to the aircraft.

22. The tactile device as recited in claim 18 wherein the infinitely-variable characteristic is a pressure provided by the tactor to the operator.

23. A method for actuating a plurality of tactors passively attached to an aircraft operator, the plurality of tactors including a first tactor and a second tactor neighboring the first tactor, the method comprising:

actuating a first tactor when a variable reaches a first predetermined value or as a marker, the variable being a function of a variable representing a characteristic of the operation of the aircraft; and actuating the second tactor when the variable reaches a second predetermined value.

24. A method for actuating a strip-shaped tactor passively attached to an aircraft operator, the strip-shaped tactor being longitudinally actuable, the method comprising:

actuating the strip-shaped tactor to provide a signal at a first tactile location when a variable reaches a first predetermined value or as a marker, the variable being a function of a variable representing a characteristic of the operation of the aircraft; and actuating the strip-shaped tactor to provide further signals longitudinally downstream from the first tactile location as a value of the variable changes.

25. A tactile device for a motor vehicle or equipment operator comprising:

a plurality of tactors passively attached to the motor vehicle or equipment operator, the plurality of tactors including a first tactor and a second tactor neighboring the first tactor; and a control system controlling actuation of the tactors as a function of a variable representing a characteristic of the operation of the motor vehicle or equipment, the control system actuating the first tactor when the variable reaches a first predetermined value, and actuating both the first and second tactor when the variable reaches a second predetermined value different from the first predetermined value.

26. A tactile device comprising:

a first tactor for providing electricity to the skin of a user of the tactile device;

a second tactor for contacting the skin; and a controller for determining an electrical conductivity of the skin between the first and second tactors.

* * * * *